US012658147B2

(12) United States Patent
Ban et al.

(10) Patent No.: US 12,658,147 B2
(45) Date of Patent: Jun. 16, 2026

(54) DISPLAY DEVICE

(71) Applicant: Samsung Display Co., LTD., Yongin-si (KR)

(72) Inventors: Seok Gyu Ban, Yongin-si (KR); Byoung Kwan An, Yongin-si (KR); Kyoung Ho Lim, Yongin-si (KR); Sang Myeon Han, Yongin-si (KR); Seung Ho Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/984,790

(22) Filed: Dec. 17, 2024

(65) Prior Publication Data

US 2025/0308467 A1 Oct. 2, 2025

(30) Foreign Application Priority Data

Mar. 26, 2024 (KR) ........................ 10-2024-0040933

(51) Int. Cl.
*G09G 3/3275* (2016.01)
*G09G 3/32* (2016.01)
(Continued)

(52) U.S. Cl.
CPC ............ *G09G 3/3291* (2013.01); *G09G 3/32* (2013.01); *G09G 3/3266* (2013.01);
(Continued)

(58) Field of Classification Search
CPC ...... G09G 3/3291; G09G 3/32; G09G 3/3266; G09G 2310/0267; G09G 2310/0275;
(Continued)

(56) References Cited

U.S. PATENT DOCUMENTS

| | | | | |
|---|---|---|---|---|
| 2016/0077553 A1* | 3/2016 | Hyun | ..................... | G09G 3/035 345/690 |
| 2017/0032723 A1* | 2/2017 | Kim | ..................... | G09G 3/3266 |

(Continued)

FOREIGN PATENT DOCUMENTS

| | | |
|---|---|---|
| KR | 2023-0074357 A | 5/2023 |
| KR | 2023-0089625 A | 6/2023 |
| KR | 2024-0041420 A | 4/2024 |

*Primary Examiner* — Abdul-Samad A Adediran
(74) *Attorney, Agent, or Firm* — Womble Bond Dickinson (US) LLP

(57) ABSTRACT

A display device includes a display panel displaying images with a plurality of pixels in a display area, a scan driver supplying compensation gate scan signals to the plurality of pixels in units of horizontal lines through compensation gate lines, a data driver detecting pixel driving current values output from the plurality of pixels by the compensation gate scan signals, generating data voltages according to compensation image data, and supplying the data voltage to data lines of the display area, and a display driver dividing the display area into block areas, setting compensation gain values for each of the block areas using the pixel driving current values, correcting image data with the compensation gain values, and supplying the corrected image data to the data driver, the display driver generating the compensation image data using the compensation gain values for each of the block areas.

18 Claims, 13 Drawing Sheets

(51) Int. Cl.
*G09G 3/3266* (2016.01)
*G09G 3/3291* (2016.01)

(52) U.S. Cl.
CPC ............... *G09G 2310/0267* (2013.01); *G09G 2310/0275* (2013.01); *G09G 2320/0257* (2013.01); *G09G 2320/0271* (2013.01)

(58) Field of Classification Search
CPC ... G09G 2320/0257; G09G 2320/0271; G09G 3/035; G09G 3/3233
USPC .................................................... 345/55, 690
See application file for complete search history.

(56) References Cited

U.S. PATENT DOCUMENTS

2023/0133826 A1* 5/2023 Lee ...................... G09G 3/3233 345/55
2024/0105102 A1 3/2024 Bang et al.

* cited by examiner

FIG. 8A

AA

| | | |
|---|---|---|
| 42.5 | 58.8 | 47.8 |
| 44 | 65.8 | 50 |
| 43.3 | 56.3 | 46.8 |

FIG. 8B

AA

| | | |
|---|---|---|
| 48.8 | 69 | 57.8 |
| 49.5 | 71.3 | 59.3 |
| 48.5 | 65.8 | 56.3 |

DISPLAY DEVICE

CROSS-REFERENCE TO RELATED APPLICATION

The present application claims priority to and the benefit of Korean Patent Application No. 10-2024-0040933, filed on Mar. 26, 2024, in the Korean Intellectual Property Office, the entire disclosure of which is incorporated herein by reference.

BACKGROUND

1. Field

Aspects of some embodiments of the present disclosure relate to a display device.

2. Description of the Related Art

As the information society develops, consumer demand for display devices for displaying images has increased and diversified. For example, display devices may be applied to various electronic devices such as smartphones, digital cameras, laptop computers, navigation devices, and smart televisions.

Display devices may be flat panel display devices such as liquid crystal display devices, field emission display devices, or organic light emitting display devices. Among such flat panel display devices, a light emitting display device may display images without a backlight unit providing light to a display panel because each of pixels of the display panel includes light emitting elements that may emit light by themselves.

The display device generally includes a display panel including a plurality of pixels connected to data lines and scan signal lines, a scan driver supplying scan signals to the scan signal lines, a data driver supplying data voltages to the data lines, and a display driver controlling driving timings of the scan driver and the data driver.

The scan driver may sequentially supply the scan signals to the scan signal lines in units of horizontal periods, and the data driver may supply the data voltages to the data lines in units of horizontal lines. The data driver may sense driving currents from the plurality of pixels, and the display driver may perform control operations so that the data voltages are compensated for using current sensing data.

The above information disclosed in this Background section is only for enhancement of understanding of the background and therefore the information discussed in this Background section does not necessarily constitute prior art.

SUMMARY

Aspects of some embodiments of the present disclosure include a display device capable of compensating for image data by dividing an image display area into a plurality of block areas and correcting temperature data so that consistency of temperature data calculated for each block area may be relatively improved.

However, aspects of embodiments according to the present disclosure are not restricted to those set forth herein. The above and other aspects of embodiments according to the present disclosure will become more apparent to one of ordinary skill in the art to which the present disclosure pertains by referencing the detailed description of the present disclosure given below.

According to some embodiments of the present disclosure, a display device includes: a display panel displaying an image by including a plurality of pixels arranged in a display area thereof, a scan driver supplying compensation gate scan signals to the plurality of pixels in units of horizontal lines through compensation gate lines of the display area, a data driver detecting pixel driving current values output from the plurality of pixels by the compensation gate scan signals, generating data voltages according to compensation image data, and supplying the data voltage to data lines of the display area, and a display driver dividing the display area into block areas, setting compensation gain values for each of the block areas using the pixel driving current values, correcting image data with the compensation gain values for each of the block areas, and supplying the corrected image data to the data driver, wherein the display driver generates the compensation image data by compensating for a gray-scale value or a luminance value of the image data for each of the block areas using the compensation gain values for each of the block areas.

According to some embodiments, the data driver senses pixel driving voltages and currents for the pixels through voltage detection lines of the display area, and generates current sensing data corresponding to amounts of the sensed pixel driving currents of the pixels and transmits the current sensing data to the display driver.

According to some embodiments, the display driver divides the display area into preset N×M block areas and divides the current sensing data in units of at least one frame for each of the N×M block areas so as to correspond to the N×M block areas, and calculates maximum and average temperature data for each of the N×M block areas so as to correspond to maximum current sensing data and average current sensing data for each of the N×M block areas.

According to some embodiments of the present disclosure, a display device includes: a display panel displaying an image by including a plurality of pixels arranged in a display area thereof, a scan driver supplying compensation gate scan signals to the plurality of pixels in units of horizontal lines through compensation gate lines of the display area, a data driver detecting pixel driving current values output from the plurality of pixels by the compensation gate scan signals, generating data voltages according to compensation image data, and supplying the data voltage to data lines of the display area, and a display driver dividing the display area into block areas, setting compensation gain values for each of the block areas using the pixel driving current values, correcting image data with the compensation gain values for each of the block areas, and supplying the corrected image data to the data driver, wherein the display driver divides the display area into preset N×M block areas and generates the compensation image data by compensating for and modulating the image data for each of the N×M block areas with the compensation gain values for each of the N×M block areas.

In a display device according to some embodiments of the present disclosure, it may be possible to correct temperature data so that consistency of temperature data for each block area of an image display area may be relatively improved and compensate for image data using the corrected temperature data.

For example, by compensating for the image data according to a change in temperature characteristics for each block area using the corrected temperature data having the improved consistency, it may be possible to relatively improve an afterimage detection error for each block area and relatively improve afterimage compensation performance.

The characteristics of embodiments according to the present disclosure are not limited to the aforementioned characteristics, and various other characteristics are included in the present specification.

BRIEF DESCRIPTION OF THE DRAWINGS

The above and other aspects and characteristics of embodiments according to the present disclosure will become more apparent by describing in more detail aspects of some embodiments thereof with reference to the attached drawings, in which:

FIGS. 8A and 8B are block diagrams for describing a method of comparing average and maximum temperature data of any one block area with each other;

DETAILED DESCRIPTION

Aspects of some embodiments of the present disclosure will now be described more fully hereinafter with reference to the accompanying drawings, in which aspects of some embodiments of the disclosure are shown. This disclosure may, however, be embodied in different forms and should not be construed as limited to the embodiments set forth herein. Rather, these embodiments are provided so that this disclosure will be more thorough and more complete, and will more fully convey the scope of embodiments according to the present disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, aspects of some embodiments will be described in more detail with reference to the accompanying drawings.

Figure 1:
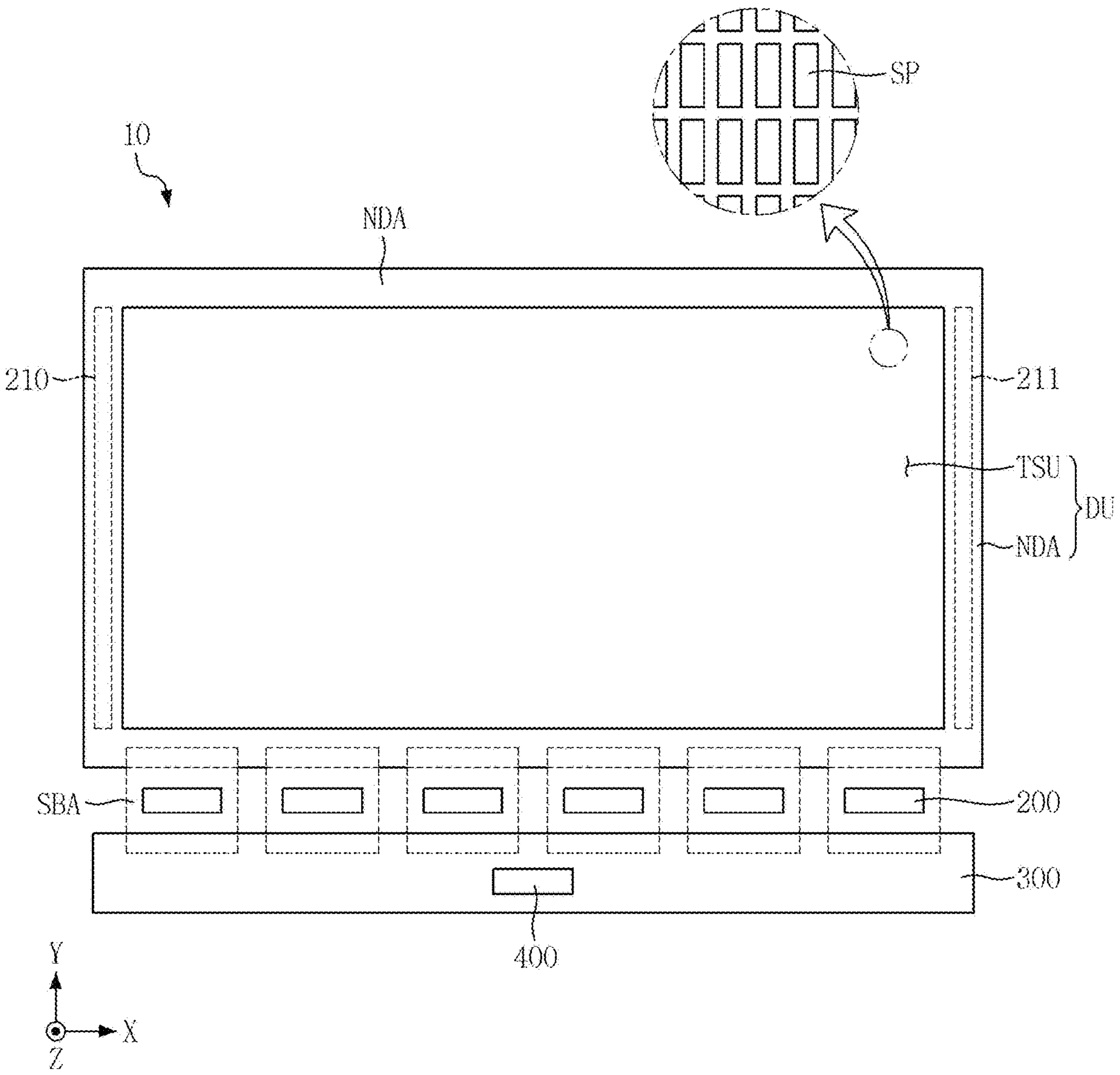
FIG. 1 is a plan view illustrating a configuration of a display device according to some embodiments of the present disclosure.

FIG. 1 is a plan view illustrating a configuration of a display device according to some embodiments of the present disclosure. In addition, FIG. 2 is a side cross-sectional view illustrating the display device of FIG. 1 in more detail.

Figure 2:
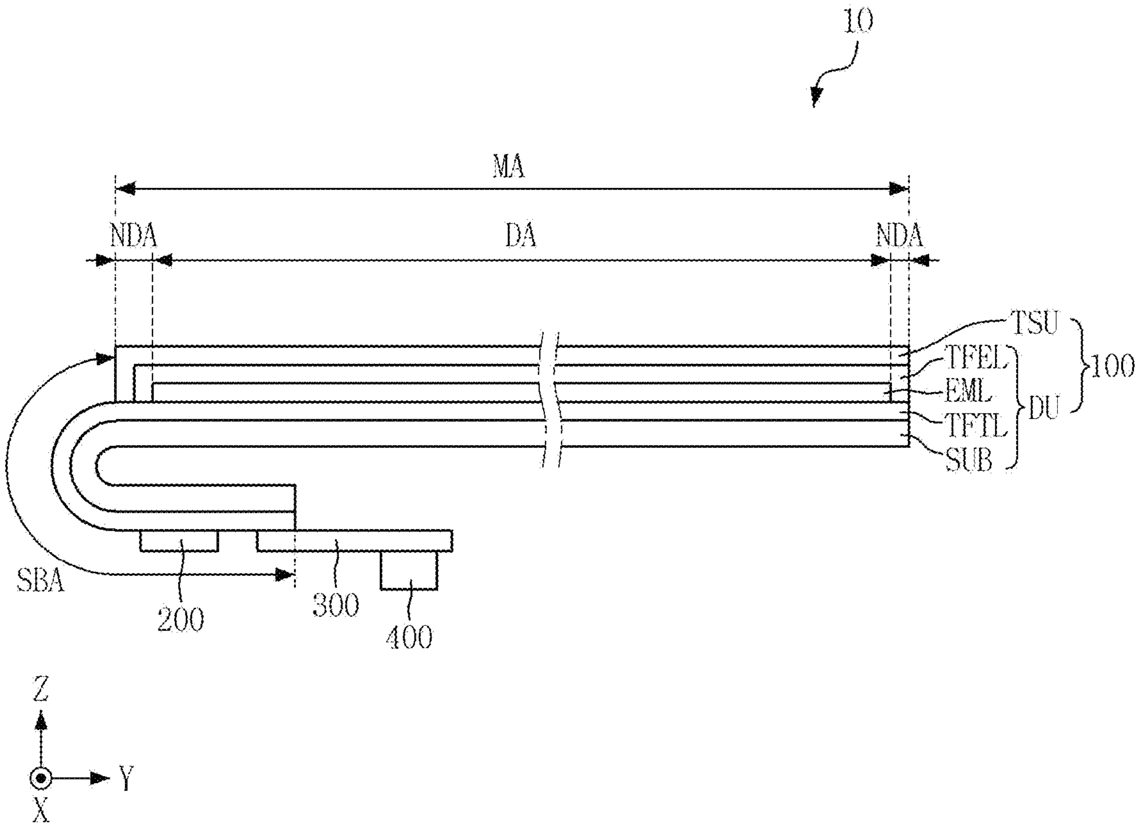
FIG. 2 is a side cross-sectional view illustrating the display device of FIG. 1 in detail.

Referring to FIGS. 1 and 2, a display device 10 according to some embodiments may be applied to portable electronic devices such as tablet personal computers (PCs), portable multimedia players (PMPs), navigation devices, ultra mobile PCs (UMPCs), electronic books, electronic notebooks, mobile phones, smartphones, and mobile communication terminals. For example, the display device 10 may be applied as a display unit for televisions, laptop computers, monitors, billboards, or the Internet of Things (IOTs).

The display device 10 according to some embodiments may be variously classified according to a display method. For example, the display device 10 may be, for example, a micro light emitting diode (LED) display device (micro-LED), a nano LED display device (nano-LED), a liquid crystal display device (LCD), a plasma display panel (PDP), a field emission display device (FED), an electrophoretic display device (EPD), an organic light emitting display device (OLED), an inorganic light emitting display device (inorganic EL), a quantum dot light emitting display device (QED), and the like. Hereinafter, an organic light emitting display device (OLED) will be described as an example of the display device 10 according to some embodiments, and an organic light emitting display device (OLED) according to some embodiments will be abbreviated as a display device 10 unless special distinction is required. The display device 10 according to some embodiments is not limited to the organic light emitting diode display device (OLED), and may be other display devices mentioned above or known in the art without departing from the spirit and scope of embodiments according to the present disclosure.

The display device 10 according to some embodiments may have a generally rectangular shape, a square shape, a circular shape, an elliptical shape, or a quadratic shape in a plan view. For example, when the display device 10 is a mobile device such as a tablet PC, the display device 10 may have a rectangular shape of which long sides thereof are positioned in a transverse direction. However, embodiments according to the present disclosure are not limited thereto, and the long sides of the display device 1 may be positioned in a longitudinal direction or the display device 1 may be rotatably installed, such that the long sides of the display device 1 may be variably positioned in the transverse or longitudinal direction.

The display device 10 includes a display panel 100, a touch sensing unit TSU, first and second scan driver 210 and 211, a data driver 200, and a display driver 400.

The display panel 100 of the display device 10 includes a display unit DU configured to display images, and the touch sensing unit TSU sensing a touch by a body part such as a finger, an electronic pen, or the like, is located on the display panel 100. The display unit DU of the display panel 100 may include a plurality of pixels SP and display the image through the plurality of pixels SP. In addition, the touch sensing unit TSU may be mounted on a front surface portion of the display panel 100 or be formed integrally with the display panel 100. Such a touch sensing unit TSU may include a plurality of touch electrodes and sense a user's touch in a capacitive manner using the touch electrodes.

The first scan driver 210 supplies gate scan signals to the pixels SP for each horizontal line through gate lines for each horizontal line of the display unit DU based on a first gate driving control signal from the display driver 400. The first scan driver 210 sequentially drives the pixels SP for each horizontal line by sequentially supplying the gate scan signals to the gate lines for each horizontal line. In addition, the second scan driver 211 supplies compensation gate scan signals to compensation gate lines for each horizontal line of the display unit DU based on a second gate driving control signal. The second scan driver 211 performs control so that pixel driving voltages of the respective pixels SP are output for each horizontal line by sequentially supplying the compensation gate scan signals to the compensation gate lines for each horizontal line.

The data driver 200 may include a plurality of data driving integrated circuits. The data driver 200 outputs data voltages according to image data to the pixels SP of the display unit DU based on a data driving control signal from the display driver 400. For example, the data driving integrated circuits may supply the data voltages to data lines to which the respective pixels SP are connected, in units of horizontal lines every horizontal cycle.

The display driver 400 may operate as a main processor or may be formed integrally with the main processor. Accordingly, the display driver 400 may control overall functions of the display device 10. For example, the display driver 400 sorts image data from the outside (e.g., from an external source) and supplies the image data to the data driving integrated circuits of the data driver 200, and controls a driving timing of the data driver 200. In addition, the display driver 400 controls a gate scan signal output timing of the first scan driver 210 and a compensation gate scan signal output timing of the second scan driver 211. In addition, the display driver 400 controls data voltage output timings of the data driving integrated circuits included in the data driver 200 by generating data control signals.

Meanwhile, the display driver 400 may detect touch coordinate information included in touch data of the touch sensing unit TSU and then generate digital image data according to the touch coordinate information. In addition, the display driver 400 may execute an application indicated by an icon displayed at user's touch coordinates. As another example, the display driver 400 may receive coordinate data from the electronic pen or the like, decide touch coordinates of the electronic pen, and then generate digital image data according to the touch coordinates or execute an application indicated by an icon displayed at the touch coordinates of the electronic pen.

Referring to FIG. 2, the display panel 100 may be divided into a main area MA and a sub-area SBA. The main area MA may include a display area DA including the pixels SP displaying an image and a non-display area NDA arranged around the display area DA. In the display area DA, images may be displayed by emitting light from emission areas or opening areas of the respective pixels SP. To this end, the pixels SP of the display area DA may include pixel circuits including switching elements, a pixel defining layer defining the emission areas or the opening areas, and self-light emitting elements.

The non-display area NDA may be any one outer area of the display area DA or an area outside (e.g., in a periphery or outside a footprint of) the display area DA. The non-display area NDA may be defined as an edge area of the main area MA of the display panel 100. In the non-display area NDA, the first and second scan drivers 210 and 211, the data driver 200, and fan-out lines connecting the display driver 400 and the display area DA to each other may be formed.

The sub-area SBA may extend from one side of the main area MA. The sub-area SBA may be formed as a film made of a flexible material that may be bent, folded, and rolled. For example, when the sub-area SBA is bent, the sub-area SBA may overlap the main area MA in a thickness direction (Z-axis direction). The sub-area SBA may include the data driver 200 and pad portions connected to a circuit board 300. Alternatively, the sub-area SBA may be omitted, and the data driver 200 and the pad portions may be located in the non-display area NDA.

The data driver 200 may be formed as a plurality of integrated circuits (IC) and mounted on the display panel 100 in a chip on glass (COG) manner, a chip on plastic (COP) manner, or an ultrasonic bonding manner. As an example, the data driver 200 may be located in the sub-area SBA, and may overlap the main area MA in the thickness direction (Z-axis direction) by bending of the sub-area SBA. As another example, the data driver 200 may be mounted on the circuit board 300.

The circuit board 300 may be electrically connected to the pad portions of the display panel 100 by an anisotropic conductive film (ACF). To this end, lead lines of the circuit board 300 may be electrically connected to the pad portions of the display panel 100. The circuit board 300 may be a flexible printed circuit board, a printed circuit board, or a flexible film such as a chip on film.

Meanwhile, the display driver 400 may be mounted on the circuit board 300. The display driver 400 may be formed as an integrated circuit (IC).

Figure 3:
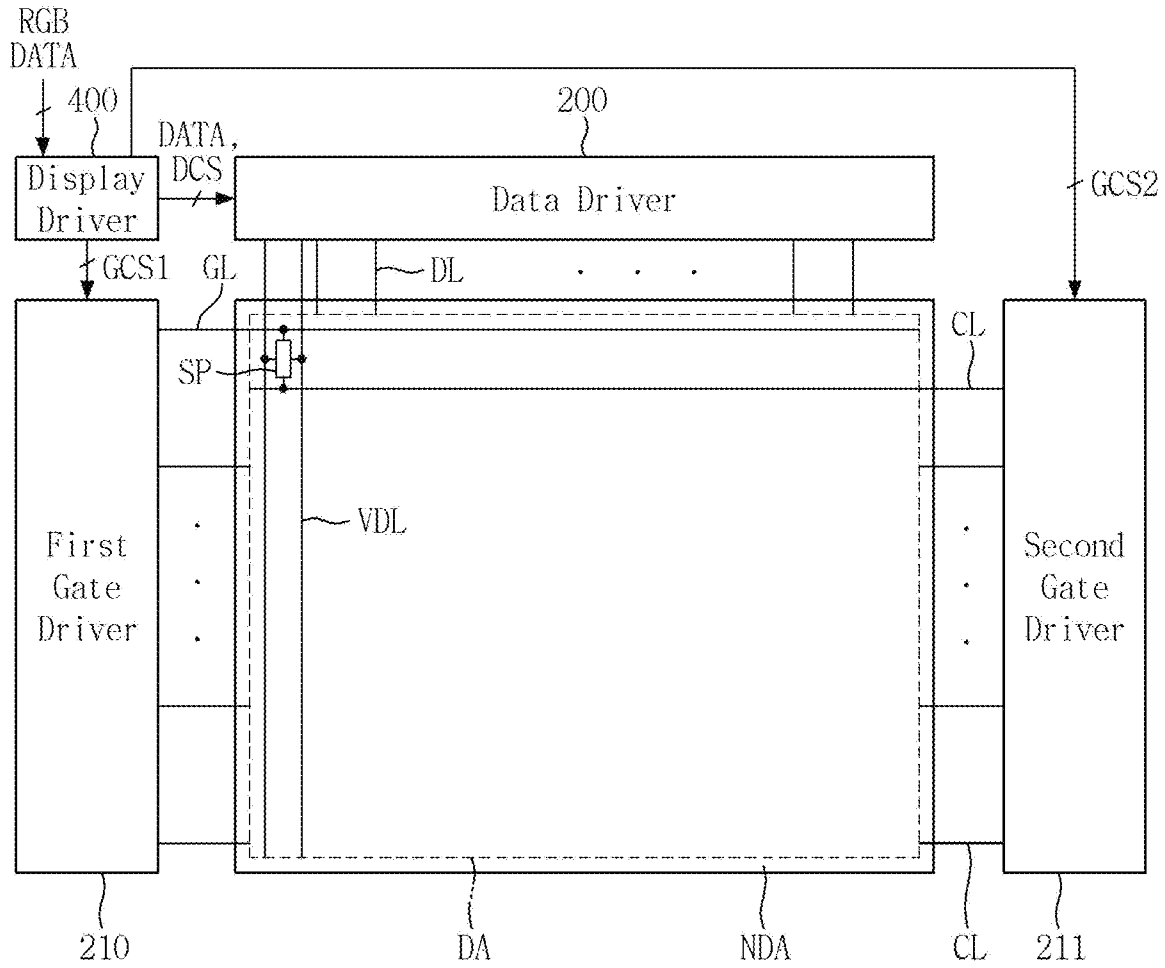
FIG. 3 is a block diagram illustrating an electrical connection relationship between a display panel and drivers illustrated in FIGS. 1 and 2.

FIG. 3 is a block diagram illustrating an electrical connection relationship between a display panel and drivers illustrated in FIGS. 1 and 2.

Referring to FIG. 3, a plurality of pixels SP are arranged in a matrix type in the display area DA. In addition, a plurality of gate lines GL connected to pixels SP of each horizontal line for each horizontal line and a plurality of compensation gate lines CL connected to the pixels SP of each horizontal line for each horizontal line are arranged in the display area DA and the non-display area NDA.

The plurality of gate lines GL and the plurality of compensation gate lines CL may extend in an X-axis direction, which is a first horizontal direction, and may be spaced apart from each other in a first vertical direction crossing the first horizontal direction. The plurality of gate lines GL and the plurality of compensation gate lines CL may be arranged at regular intervals along the first vertical direction.

The first scan driver 210 supplies gate scan signals to the pixels SP for each horizontal line through gate lines GL for each horizontal line based on a first gate driving control signal GCS1 from the display driver 400. The plurality of gate lines GL sequentially supply the gate scan signals sequentially generated for each horizontal cycle from the first scan driver 210 to the plurality of pixels SP for each horizontal line.

The second scan driver 211 controls the respective pixels SP so that pixel driving voltages and currents of the respective pixels SP are output to respective voltage detection lines VDL for each horizontal line. To this end, the second scan driver 211 sequentially supplies compensation gate scan signals to the compensation gate lines CL for each horizontal line based on a second gate driving control signal GCS2 from the display driver 400. The plurality of compensation gate lines CL sequentially supplies the compensation gate scan signals sequentially generated for each horizontal cycle from the second scan driver 211 to the plurality of pixels SP for each horizontal line.

The gate scan signals of the first scan driver 210 and the compensation gate scan signals of the second scan driver 211 may be alternately generated at different timings for each horizontal period. For example, the gate scan signal may first be supplied to the gate line GL in units of each horizontal period, and the compensation gate scan signal may be supplied to the compensation gate line CL in units of the next horizontal period.

In addition, a plurality of data lines DL connected to the pixels SP of each vertical line for each vertical line may be arranged in the display area DA and the non-display area NDA, and may be electrically connected to the data driver 200. The data voltage may determine emission luminance of each of the plurality of pixels SP. In addition, a plurality of voltage detection lines VDL connected to the pixels SP of each vertical line for each vertical line may be arranged in the display area DA and the non-display display area NDA, and may be electrically connected to the data driver 200. The pixels SP of each horizontal line share the pixel driving voltages with the respective voltage detection lines VDL in response to the compensation gate scan signals input in units of horizontal periods. Accordingly, the data driver 200 receives the pixel driving voltages and currents of the respective pixels SP in units of horizontal lines through the respective voltage detection lines VDL.

For example, the data driving integrated circuits of the data driver 200 receive and sense the pixel driving voltages and currents for the pixels SP in units of horizontal lines for each horizontal cycle through the respective voltage detection lines VDL. As an example, the data driving integrated circuits may sequentially sense the pixel driving voltages and currents received from the respective pixels SP in units of horizontal lines for each horizontal cycle.

The data driving integrated circuits generate voltage sensing data or current sensing data by performing analog-digital modulation according to magnitudes of the sensed pixel driving voltages and amounts of the sensed pixel driving currents of the respective pixels SP. The data driving integrated circuits transmit the voltage and current sensing data to the display driver 400 in units of at least one horizontal line.

The display driver 400 may receive digital image data RGB DATA and timing synchronization signals from the outside. The display driver 400 controls an operation timing of the data driver 200 by generating a data driving control signal DCS based on the timing synchronization signals. In addition, the display driver 400 controls an operation timing of each of the first and second scan driver 210 and 211 by generating the first and second gate driving control signals GCS1 and GCS2.

Meanwhile, the display driver 400 receives the voltage and current sensing data in units of at least one horizontal line. In addition, the display driver 400 sorts and stores the voltage and current sensing data in units of at least one frame. In this case, the display driver 400 may sort and store the voltage and current sensing data in units of at least one frame so as to correspond to pixel array resolution of the display area DA.

The display driver 400 may divide the display area DA into preset N×M block areas based on the pixel array resolution of the display area DA. Here, N and M are positive integers, and may be the same as or different from each other. The display driver 400 divides the voltage and current sensing data in units of at least one frame for each of the N×M block areas so as to correspond to the N×M block areas. In addition, the display driver 400 compares current values of the current sensing data for each of the N×M block areas with each other and performs an average operation to calculate maximum current sensing data and average current sensing data for each of the N×M block areas.

The display driver 400 compares and analyzes maximum and average current values included in the maximum current sensing data and the average current sensing data with preset reference temperature data. In addition, the display driver 400 calculates maximum and average temperature values corresponding to the maximum and average current values and maximum and average temperature data including the maximum and average temperature values, that is, maximum and average temperature data for each of the N×M block areas.

The display driver 400 compares average temperature data of each of the N×M block areas with average temperature data of other block areas located adjacent to each other. In addition, the display driver 400 calculates and sets a compensation gain value corresponding to each average temperature data for block areas of which maximum average temperature data are not calculated among the block areas located adjacent to each other as a comparison result of the average temperature data with the adjacent block areas. On the other hand, in the case of a block area of which maximum average temperature data is calculated among the block areas located adjacent to each other, the display driver 400 additionally compares maximum temperature data of the block area with maximum temperature data of other block areas located adjacent to each other.

When the maximum temperature data (or a maximum temperature value of the maximum temperature data) is not calculated to be greatest or highest among the block areas located adjacent to each other as a comparison result between the maximum temperature data, the display driver 400 calculates and sets a compensation gain value corresponding to the average temperature data. On the other hand, when the maximum temperature data (or the maximum temperature value of the maximum temperature data) is calculated to be greatest or highest among the block areas located adjacent to each other as the comparison result between the maximum temperature data, the display driver 400 calculates upper average temperature data for temperature data higher than average temperature data of a corresponding block area, that is, temperature data of the average temperature data or higher. In addition, the display driver 400 modulates or replaces the average temperature data of the corresponding block area of which the maximum temperature data is calculated to be highest with the upper average temperature data, and calculates a compensation gain value corresponding to the upper average temperature data. Thereafter, the display driver 400 may calculate or update compensation gain values for each of the N×M block areas in units of at least one frame period.

The display driver 400 sorts the digital image data RGB DATA input from the outside in units of at least one frame according to resolution of the display area DA. In addition, the display driver 400 divides the image data of each frame so as to correspond to the N×M block areas, and compensates for and converts the respective image data corresponding to the N×M block areas using the compensation gain values for each of the N×M block areas. The display driver 400 sequentially supplies the compensated and converted image data to the data driving integrated circuits of the data driver 200 by an amount corresponding to at least one horizontal line.

The data driving integrated circuits of the data driver 200 supply data voltages according to the compensated and converted image data DATA to the data lines DL of the display unit DU based on the data driving control signal DCS. Here, the data driving integrated circuits may supply the data voltages to the data lines DL to which the respective pixels SP are connected, in units of horizontal lines every horizontal cycle.

Figure 4:
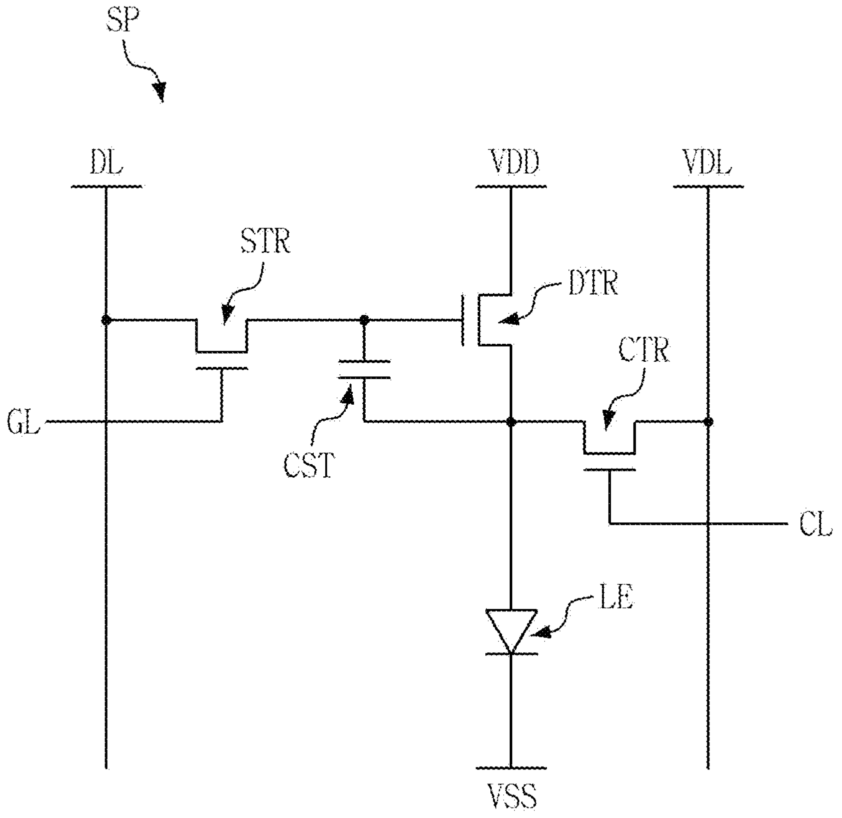
FIG. 4 is an equivalent circuit diagram of a pixel of the display panel illustrated in FIG. 3 according to some embodiments.

FIG. 4 is an equivalent circuit diagram of a pixel of the display panel illustrated in FIG. 3 according to some embodiments.

Referring to FIG. 4, each pixel SP may include two transistors STR and DTR and one storage capacitor CST for allowing a light emitting element LE to emit light and a compensation transistor CTR transmitting a pixel driving voltage supplied to the light emitting element LE to a voltage detection line VDL. Although FIG. 4 illustrates various components in a pixel SP, embodiments according to the present disclosure are not limited thereto, and according to some embodiments, the pixel SP may include additional components or fewer components without departing from the spirit and scope of embodiments according to the present disclosure.

A driving transistor DTR adjusts an amount of current flowing from a first power line VDD to which a first source voltage is supplied to the light emitting element LE according to a voltage difference between a gate electrode and a source electrode thereof. The gate electrode of the driving transistor DTR may be connected to a second electrode of a first transistor STR, a first electrode of the driving transistor DTR may be connected to the first power line VDD to which the first source voltage is applied, and a second electrode of the driving transistor DTR may be connected to a first electrode of the light emitting element LE.

The first transistor STR is turned on by a gate scan signal of a gate line GL to supply a data voltage of a data line DL to the gate electrode of the driving transistor DTR. A gate electrode of the first transistor STR may be connected to any one gate line GL, a first electrode of the first transistor STR may be connected to the data line DL, and the second electrode of the first transistor STR may be connected to the gate electrode of the driving transistor DTR.

The storage capacitor CST may be formed between the gate electrode and the second electrode of the driving transistor DTR. The storage capacitor CST stores a difference voltage between a gate voltage and a source voltage or a drain voltage of the driving transistor DTR.

The compensation transistor CTR is turned on by a compensation gate scan signal of a compensation gate line CL to electrically connect the first electrode of the light emitting element LE to any one voltage detection line VDL to each other. The pixel driving voltage may be supplied to the data driver 200 through the voltage detection line VDL.

The first transistor STR, the driving transistor DTR, and the compensation transistor CTR may be formed as thin film transistors. In addition, it has been mainly illustrated in FIG. 4 that the first transistor STR, the driving transistor DTR, and the compensation transistor CTR are N-type metal oxide semiconductor field effect transistors (MOSFETs), but embodiments according to the present disclosure are not limited thereto. For example, the first transistor STR, the driving transistor DTR, and the compensation transistor CTR may be formed as P-type MOSFETs or some of the first transistor STR, the driving transistor DTR, and the compensation transistor CTR may be formed as N-type MOSFETs and the others of the first transistor STR, the driving transistor DTR, and the compensation transistor CTR may be formed as P-type MOSFETS.

Figure 5:
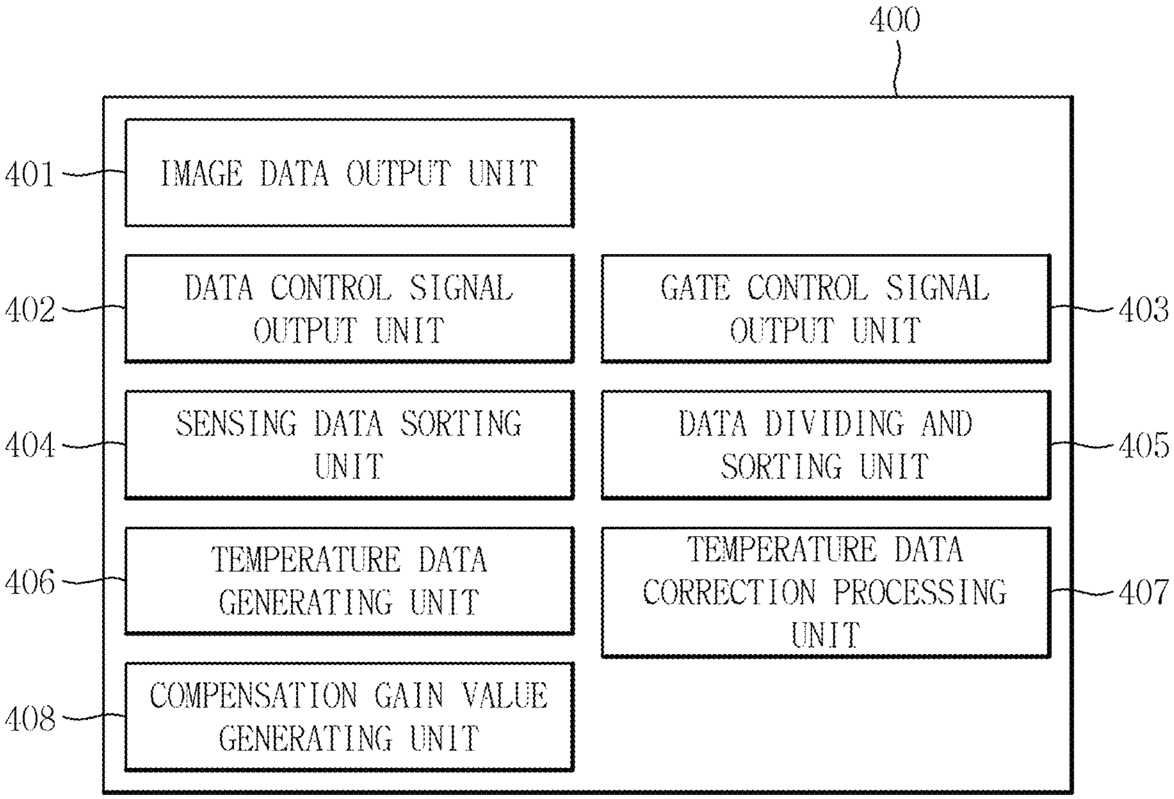
FIG. 5 is a block diagram illustrating a display driver of FIG. 3 in detail.

FIG. 5 is a block diagram illustrating a display driver of FIG. 3 in further detail according to some embodiments.

Referring to FIG. 5, the display driver 400 includes an image data output unit 401, a data control signal output unit 402, a gate control signal output unit 403, a sensing data sorting unit 404, a data dividing and sorting unit 405, a temperature data generating unit 406, a temperature data correction processing unit 407, and a compensation gain value generating unit 408.

The image data output unit 401 sorts the digital image data RGB DATA from the outside in units of at least one frame according to the resolution of the display area DA, and sequentially transmits the digital image data RGB DATA to the data driver 200 by an amount corresponding to at least one horizontal line.

In addition, the image data output unit 401 divides the digital image data RGB DATA in units of each frame so as to correspond to N×M block areas, and compensates for and converts the respective image data corresponding to the N×M block areas using compensation gain values for each of the N×M block areas. In addition, the image data output unit 401 sequentially supplies the compensated and converted image data to the data driving integrated circuits of the data driver 200 by an amount corresponding to at least one horizontal line.

The data control signal output unit 402 generates the data driving control signal DCS for controlling a data voltage output timing of the data driver 200, that is, a data voltage modulation timing and a timing of supplying data voltages to the data lines DL using vertical and horizontal timing synchronization signals input from an external graphics system or the like.

The gate control signal output unit 403 generates the first and second gate driving control signals GCS1 and GCS2 using the vertical and horizontal timing synchronization signals input from the external graphics system or the like. In addition, the gate control signal output unit 403 controls each of driving timings of the first and second scan drivers 210 and 211 by supplying the first and second gate driving control signals GCS1 and GCS2 to the first and second scan drivers 210 and 211.

The sensing data sorting unit 404 receives voltage and current sensing data of the pixels SP by an amount corresponding to at least one horizontal line in units of at least one horizontal period through the data driver 200. In addition, the sensing data sorting unit 404 sorts and stores the voltage and current sensing data in units of at least one frame. In this case, the sensing data sorting unit 404 may sort and store the voltage and current sensing data in units of at least one frame so as to correspond to pixel resolution of the display area DA.

The data dividing and sorting unit 405 divides the display area DA into preset N×M block areas based on the pixel resolution of the display area DA. The data dividing and sorting unit 405 divides and stores the voltage and current sensing data in units of at least one frame for each of the N×M block areas so as to correspond to the N×M block areas.

The temperature data generating unit 406 compares current values of the current sensing data for each of the N×M block areas with each other and performs an average operation to calculate maximum current sensing data and average current sensing data for each of the N×M block areas. In addition, the temperature data generating unit 406 compares and analyzes maximum and average current values included in the maximum current sensing data and the average current sensing data with preset reference temperature data. The temperature data generating unit 406 calculates maximum and average temperature values corresponding to the maximum and average current values and maximum and average temperature data including the maximum and average temperature values, that is, maximum and average temperature data for each of the N×M block areas.

The temperature data correction processing unit 407 compares average temperature data of each of the N×M block areas with average temperature data of other block areas located adjacent to each other. In addition, the temperature data correction processing unit 407 transmits average temperature data of block areas of which maximum average temperature data are not calculated to be greatest among the block areas located adjacent to each other as a comparison result of the average temperature data with the adjacent block areas to the compensation gain value generating unit 408.

On the other hand, in the case of a block area of which maximum average temperature data is calculated to be greatest among the block areas located adjacent to each other, the temperature data correction processing unit 407 additionally compares maximum temperature data of the block area with maximum temperature data of other block areas located adjacent to each other. When the maximum temperature data (or a maximum temperature value of the maximum temperature data) is not calculated among the block areas located adjacent to each other as a comparison result between the maximum temperature data, the temperature data correction processing unit 407 transmits average temperature data of a corresponding block area to the compensation gain value generating unit 408.

On the other hand, when the maximum temperature data (or the maximum temperature value of the maximum temperature data) is calculated to be greatest or highest among the block areas located adjacent to each other as the comparison result between the maximum temperature data, the temperature data correction processing unit 407 calculates upper average temperature data for temperature data higher than average temperature data of a corresponding block area, that is, temperature data of the average temperature data or higher. In addition, the temperature data correction processing unit 407 modulates or replaces the average temperature data of the corresponding block area of which the maximum temperature data is calculated to be highest with the upper average temperature data, and transmits the upper average temperature data of the corresponding block to the compensation gain value generating unit 408.

The compensation gain value generating unit 408 calculates and sets a compensation gain value corresponding to each average temperature data for block areas of which maximum average temperature data are not calculated by the temperature data correction processing unit 407.

In addition, the compensation gain value generating unit 408 calculates and sets a compensation gain value corresponding to each average temperature data for average temperature data of a block area of which the maximum temperature data (or the maximum temperature value of the maximum temperature data) is not calculated among the block areas located adjacent to each other as the comparison result between the maximum temperature data.

The compensation gain value generating unit 408 calculates and sets a compensation gain value corresponding to the upper average temperature data of the corresponding block area of which the maximum temperature data is calculated to be highest.

Thereafter, the compensation gain value generating unit 408 calculates or updates compensation gain values for each of the N×M block areas in units of at least one frame period and transmits the calculated and updated compensation gain values to the video data output unit 401 in real time.

Figure 6:
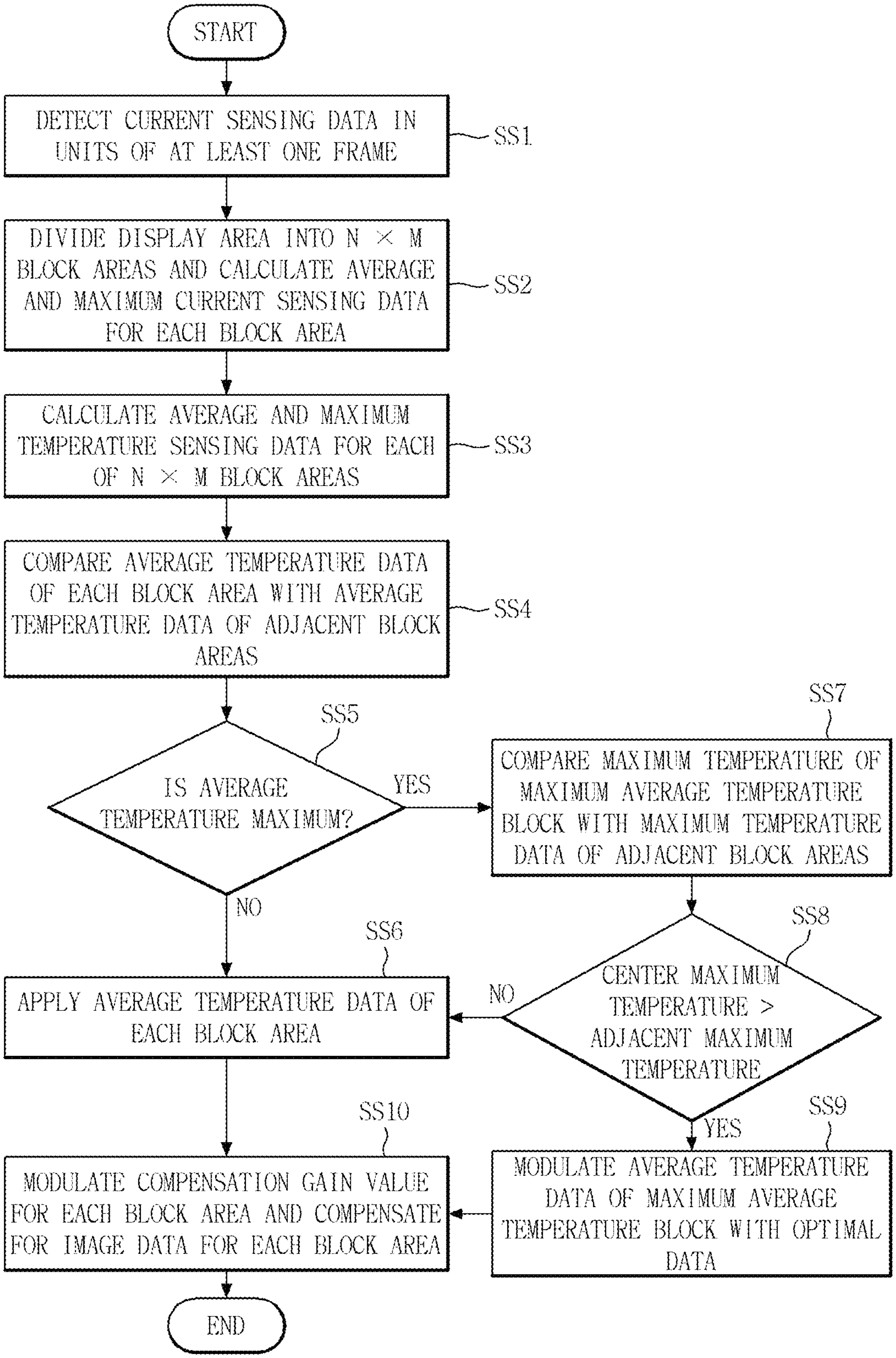
FIG. 6 is a flowchart illustrating a method of detecting and modulating temperature data for each block area according to some embodiments.

FIG. 6 is a flowchart illustrating a method of detecting and modulating temperature data for each block area according to some embodiments. Although FIG. 6 illustrates and describes various operations in a method of detecting and modulating temperature data, embodiments according to the present disclosure are limited thereto, and according to various embodiments, the method may include additional operations or fewer operations without departing from the spirit and scope of embodiments according to the present disclosure.

Referring to FIG. 6, the sensing data sorting unit 404 receives voltage and current sensing data of the pixels SP by an amount corresponding to at least one horizontal line in units of at least one horizontal period through the data driver 200, and sorts and stores the voltage and current sensing data in units of at least one frame so as to correspond to pixel resolution of the display area DA (SS1).

Figure 7:
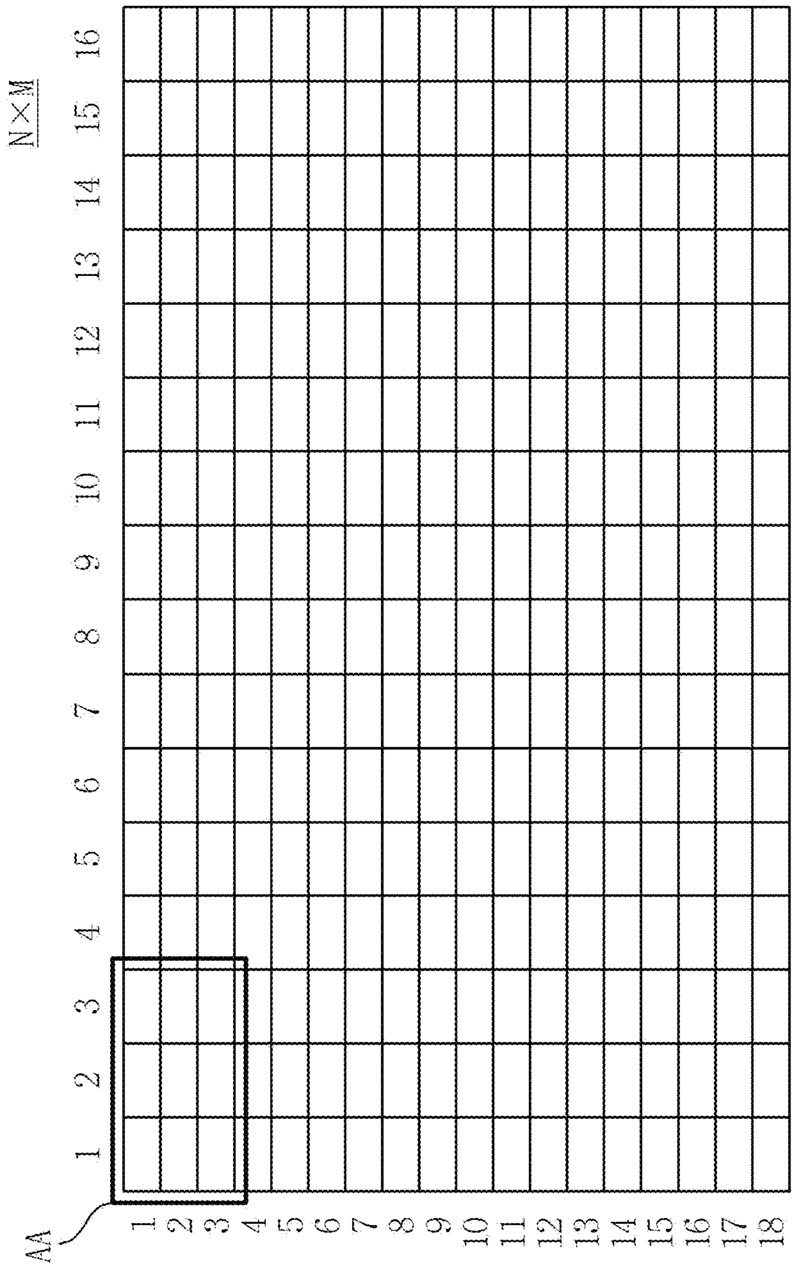
FIG. 7 is a view illustrating a method of dividing and setting a display area into N×M block areas according to some embodiments.

FIG. 7 is a view illustrating a method of dividing and setting a display area into N×M block areas according to some embodiments.

As an example, FIG. 7 illustrates an example of block areas divided in 16×18 block sizes. N and M are positive integers and may be the same as or different from each other, and thus, sizes and the number of block areas are not limited to those illustrated in FIG. 7.

Referring to FIG. 7, the data dividing and sorting unit 405 divides the display area DA into preset N×M block areas based on the pixel resolution of the display area DA. As an example, the pixel resolution of the display area DA may be 4K (3840×2160). In this case, when the display area DA is divided into block areas in 16×18 block sizes, pixels SP arranged in the numbers of 240×120 may be divided into the respective block areas. Here, block AA in FIG. 7 includes nine block areas corresponding to 1×1, 2×1, 3×1, 1×2, 2×2, 3×2, 1×3, 2×3, and 3×3 coordinates.

The data dividing and sorting unit 405 receives the voltage and current sensing data by an amount corresponding to at least one frame through the sensing data sorting unit 404. Accordingly, the data dividing and sorting unit 405 divides and stores the voltage and current sensing data in units of at least one frame for each of the N×M block areas so as to correspond to the N×M block areas (SS2).

Next, the temperature data generating unit 406 compares current values of the current sensing data for each of the N×M block areas with each other to extract maximum current sensing data for each of the N×M block areas. In addition, the temperature data generating unit 406 performs an average operation on the current values of the current sensing data for each of the N×M block areas to calculate average current sensing data for each of the N×M block areas.

Subsequently, the temperature data generating unit 406 compares and analyzes maximum and average current values included in the maximum current sensing data and the average current sensing data with reference temperature data preset in a look-up table or the like. The preset reference temperature data include temperature values corresponding to respective current values and temperature data including the temperature values.

The temperature data generating unit 406 calculates maximum and average temperature values corresponding to the maximum and average current values and maximum and average temperature data including the maximum and average temperature values through a comparison process between the maximum and average current sensing data for each of the N×M block areas and the reference temperature data. That is, the temperature data generating unit 406 calculates maximum and average temperature values and maximum and average temperature data including the maximum and average temperature values for each of the N×M block areas (SS3).

FIGS. 8A and 8B are block diagrams for describing a method of comparing average and maximum temperature data of any one block area with each other.

Referring first to FIG. 8A, the temperature data correction processing unit 407 compares average temperature data of each of the N×M block areas with average temperature data of other block areas located adjacent to each other (SS4). As an example, the temperature data correction processing unit 407 may compare average temperature data of the block area corresponding to the 2×1 coordinates with average temperature data of five block areas corresponding to the 1×1, 3×1, 1×2, 2×2, and 3×2 coordinates located adjacent to the 2×1 coordinates. As another example, the temperature data correction processing unit 407 may compare average temperature data of the block area corresponding to the 2×2 coordinates with average temperature data of eight block areas corresponding to the 1×1, 2×1, 3×1, 1×2, 3×2, 1×3, 2×3, and 3×3 coordinates located adjacent to the 2×2 coordinates.

The temperature data correction processing unit 407 transmits average temperature data of block areas of which maximum average temperature data are not calculated among the block areas located adjacent to each other as a comparison result of the average temperature data of each block area with the adjacent block areas to the compensation gain value generating unit 408 (SS5).

The compensation gain value generating unit 408 calculates and sets a compensation gain value corresponding to each average temperature data for the block areas of which the maximum average temperature data are not calculated by the temperature data correction processing unit 407. Specifically, the compensation gain value generating unit 408 compares and analyzes the average temperature values respectively included in the average temperature data with reference compensation data preset in a look-up table or the like. The preset reference compensation data includes corresponding compensation gain values preset to correspond to the respective temperature values. Accordingly, the temperature data correction processing unit 407 may calculate and store a compensation gain value corresponding to the average temperature value of the average temperature data for each block area (SS6).

On the other hand, referring to FIG. 8B, in the case of a block area of which maximum average temperature data is calculated among the block areas located adjacent to each other, the temperature data correction processing unit 407 additionally compares maximum temperature data of the block area with maximum temperature data of other block areas located adjacent to each other (SS7). When the maximum temperature data (or a maximum temperature value of the maximum temperature data) is not calculated among the block areas located adjacent to each other as a comparison result between the maximum temperature data, the temperature data correction processing unit 407 transmits average temperature data of a corresponding block area to the compensation gain value generating unit 408 (SS8).

The compensation gain value generating unit 408 calculates and sets a compensation gain value corresponding to each average temperature data for average temperature data of a block area of which the maximum temperature data (or the maximum temperature value of the maximum temperature data) is not calculated among the block areas located adjacent to each other as the comparison result between the maximum temperature data (SS6).

Figure 9:
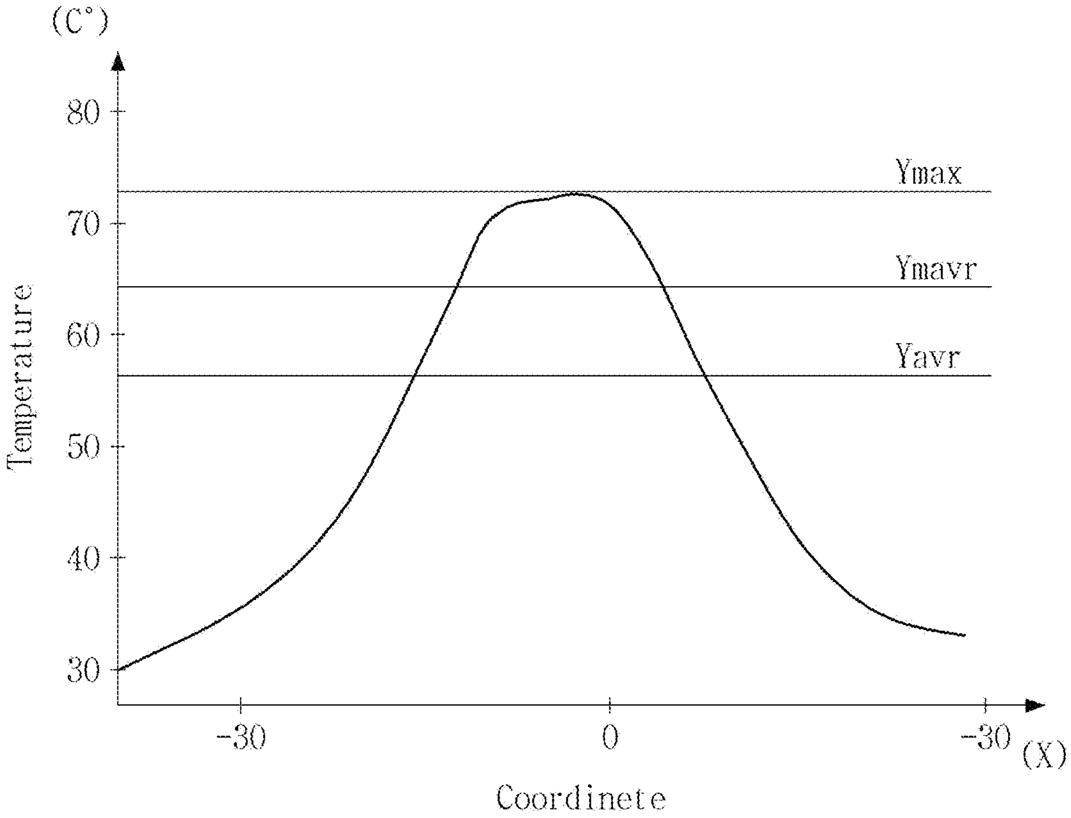
FIG. 9 is a graph for describing a method of calculating and replacing upper average temperature data of any one block area.

FIG. 9 is a graph for describing a method of calculating and replacing upper average temperature data of any one block area.

Referring to FIG. 9, when the maximum temperature data (or the maximum temperature value) is calculated to be greatest or highest among the block areas located adjacent to each other as the comparison result between the maximum temperature data as illustrated in FIG. 8B, the temperature data correction processing unit 407 calculates upper average temperature data for temperature data higher than average temperature data of a corresponding block area, that is, temperature data of the average temperature data or higher. For example, the temperature data correction processing unit 407 calculates an upper average temperature value Ymarv, which is an average temperature value of temperature values (including a maximum temperature value Vmax) of temperature data higher than an average temperature value Yavr included in the average temperature data of the corresponding block area. In addition, the temperature data correction processing unit 407 modulates or replaces the average temperature data of the corresponding block area of which the maximum temperature data is calculated to be highest with the upper average temperature data including the upper average temperature value Ymarv, and transmits the upper average temperature data of the corresponding block to the compensation gain value generating unit 408 (SS9).

The compensation gain value generating unit 408 calculates and sets a compensation gain value corresponding to each average temperature data for average temperature data of a block area of which the maximum temperature data (or the maximum temperature value of the maximum temperature data) is not calculated among the block areas located adjacent to each other as the comparison result between the maximum temperature data. In addition, the compensation gain value generating unit 408 calculates and sets a compensation gain value corresponding to the upper average temperature data of the corresponding block area of which the maximum temperature data is calculated to be highest.

Thereafter, the compensation gain value generating unit 408 calculates or updates compensation gain values for each of the N×M block areas in units of at least one frame period and transmits the calculated and updated compensation gain values to the video data output unit 401 in real time.

The image data output unit 401 divides the digital image data RGB DATA in units of each frame so as to correspond to the N×M block areas, and compensates for and converts the respective image data corresponding to the N×M block areas using compensation gain values for each of the N×M block areas. In this case, the image data output unit 401 may correct and compensate for grayscale values or luminance values of the image data by adding or subtracting the compensation gain values to or from the grayscale values or the luminance values of the image data or multiplying the grayscale values or the luminance values of the image data with the compensation gain values. The image data output unit 401 sequentially supplies the compensated and converted image data to the data driving integrated circuits of the data driver 200 by an amount corresponding to at least one horizontal line (SS10).

Figure 10:
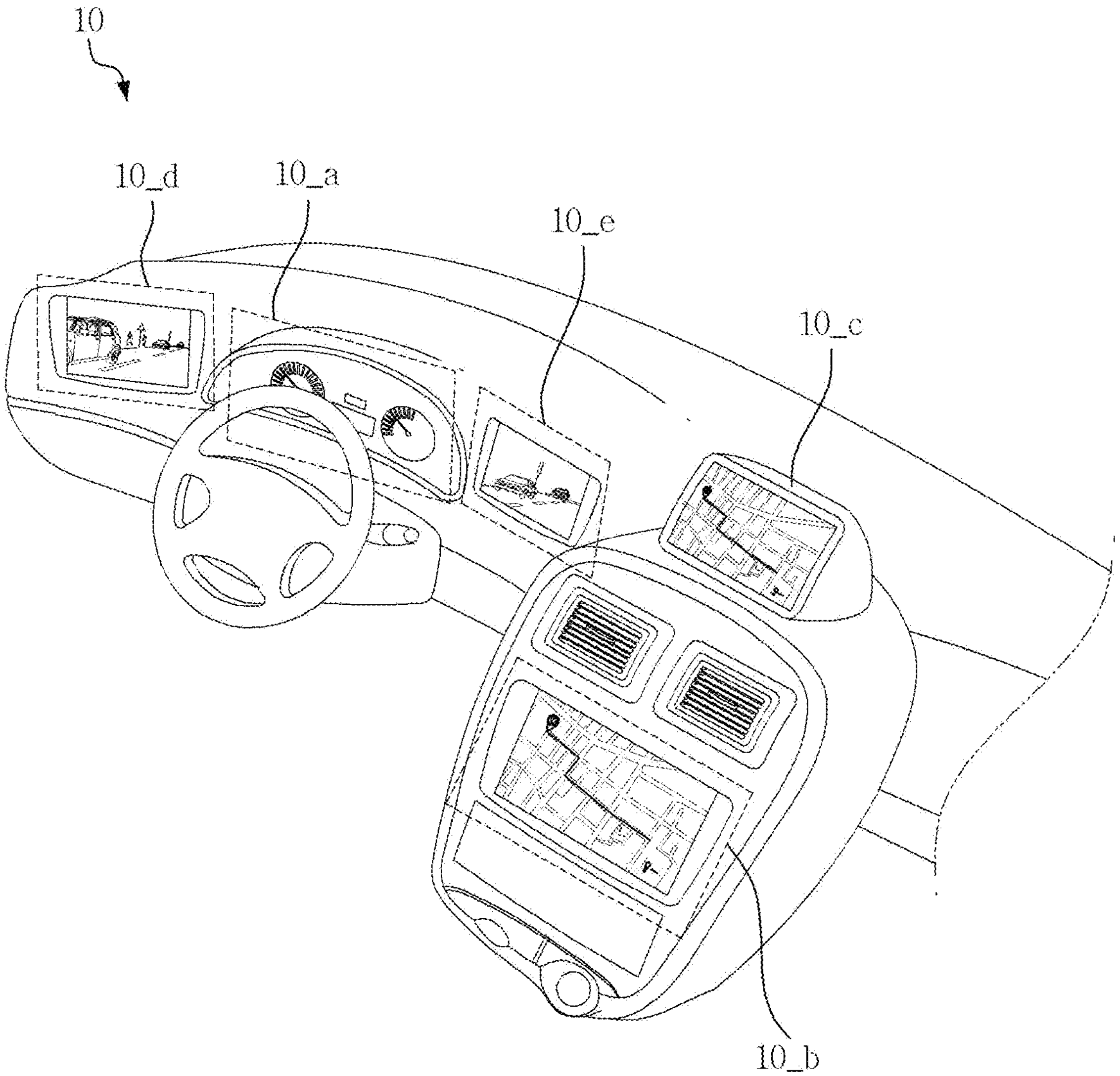
FIG. 10 is a perspective view illustrating an application example of a display device according to some embodiments of the present disclosure.

FIG. 10 is a perspective view illustrating an application example of a display device according to some embodiments of the present disclosure.

Referring to FIG. 10, the display device 10 including the display panel 100 according to the present disclosure may be applied to an instrument board 10_*a* of a vehicle, applied to a center fascia 10_*b* of the vehicle, or applied to a center information display (CID) 10_*c* located on a dashboard of the vehicle. In addition, the display devices according to some embodiments may be applied to room mirror displays 10_*d* and 10_*e* substituting for side-view mirrors of the vehicle, a navigation device, and the like.

Figure 11:
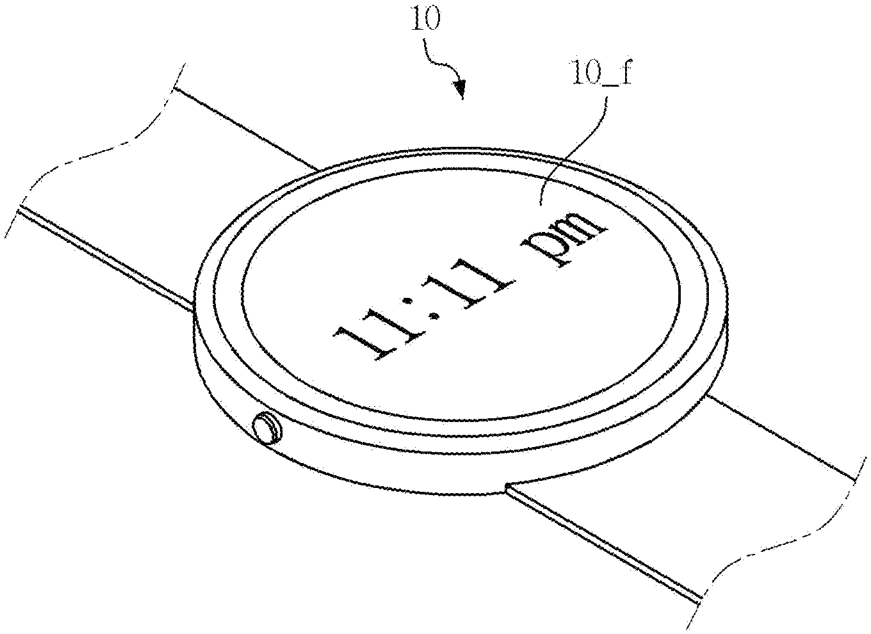
FIG. 11 is a perspective view illustrating an application example of a display device according to some embodiments of the present disclosure.

FIG. 11 is a perspective view illustrating an application example of a display device according to some embodiments of the present disclosure.

Referring to FIG. 11, the display device 10 including the display panel 100 according to the present disclosure may be applied to a watch-type smart device as a position screen display 10_*f* or the like. As such, the display device 10 including the display panel 100 according to the present disclosure may be applied as an image display or the like of a health care device or a biometric information measuring device formed to be worn on the body.

Figure 12:
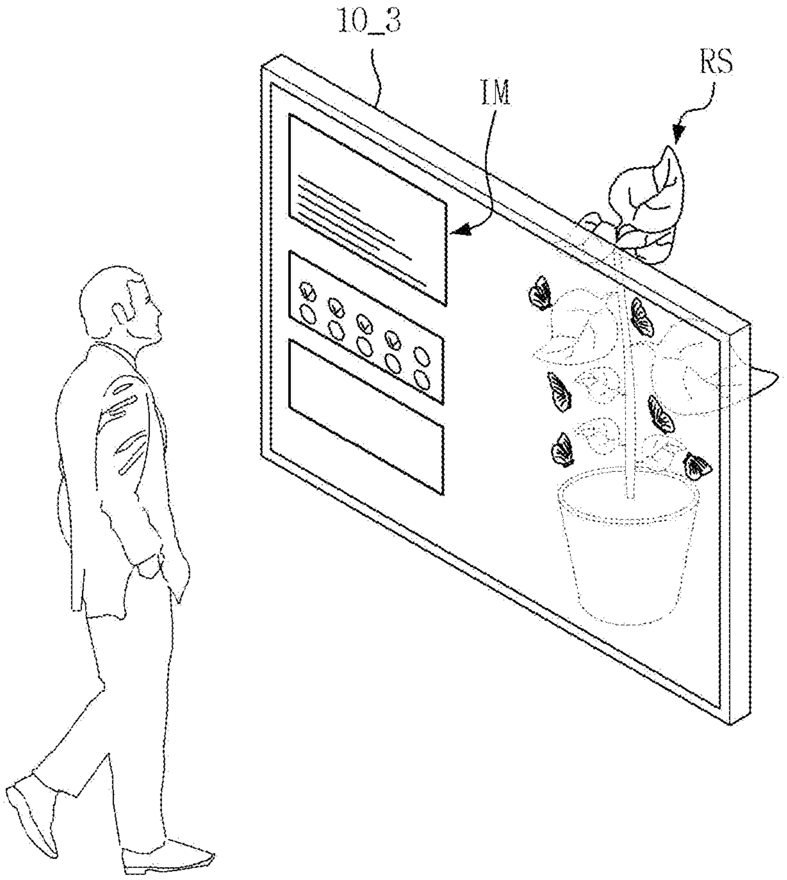
FIG. 12 is a perspective view illustrating an application example of a display device according to some embodiments of the present disclosure.

FIG. 12 is a perspective view illustrating an application example of a display device according to some embodiments of the present disclosure.

Referring to FIG. 12, the display device 10 including the display panel 100 according to the present disclosure may be applied to a transparent display device. The transparent display device may transmit light therethrough while displaying an image IM. Therefore, a user positioned on a front surface of the transparent display device may not only view the image IM displayed on the display panel 100, but also see an object RS or a background positioned on a rear surface of the transparent display device. When the display device 10 including the display panel 100 is applied to the transparent display device, the display panel 100 of the display device may include a light transmitting portion capable of transmitting light or may be made of a material capable of transmitting light.

Figure 13:
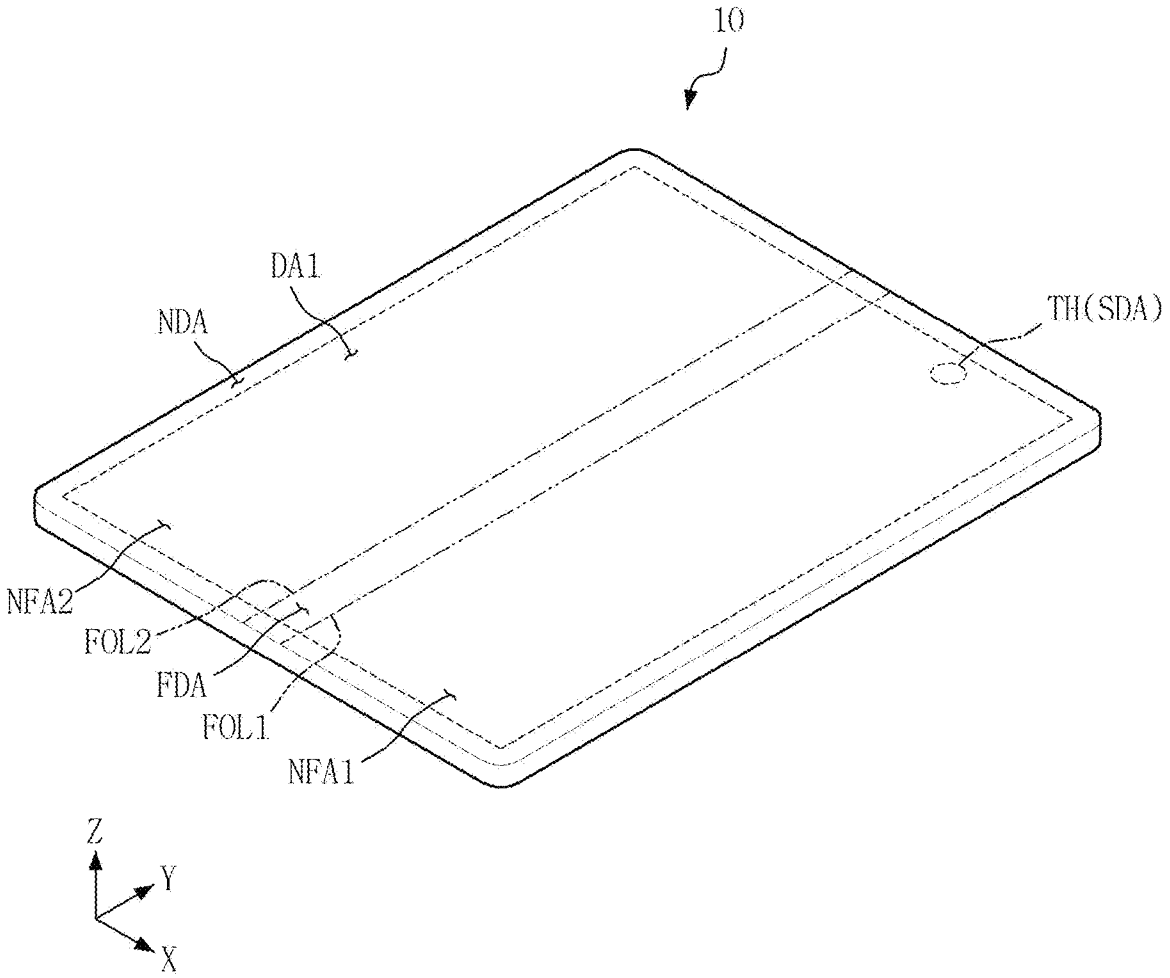
FIG. 13 is a perspective view illustrating an application example of a display device according to some embodiments of the present disclosure.

FIG. 13 is a perspective view illustrating an application example of a display device according to some embodiments of the present disclosure.

It has been illustrated in FIG. 13 that the display device 10 is a foldable display device folded in the X-axis direction. The display device 10 applied to a foldable and portable display device may be maintained in both a folded state and an unfolded state. The display device 10 may be folded in an in-folding manner in which a front surface thereof is located inside. When the foldable and portable display device 10 is bent or folded in the in-folding manner, front surfaces of the foldable and portable display device 10 may be arranged to face each other. Alternatively, the foldable and portable display device 10 may be folded in an out-folding manner in which a front surface thereof is located outside. When the foldable and portable display device 10 is bent or folded in the out-folding manner, rear surfaces of the foldable and portable display device 10 may be arranged to face each other.

A first non-folding area NFA1 may be located on one side, for example, the right side, of a folding area FDA. A second non-folding area NFA2 may be located on the other side, for example, the left side, of the folding area FDA. The touch sensing units TSU according to some embodiments of the present disclosure may be formed and located on the first non-folding area NFA1 and the second non-folding area NFA2, respectively.

A first folding line FOL1 and a second folding line FOL2 may extend in a Y-axis direction, and the display device 10 may be folded in the X-axis direction. For this reason, a length of the display device 10 in the X-axis direction may be reduced by approximately half, and thus, a user may conveniently carry the display device 10.

Meanwhile, an extension direction of the first folding line FOL1 and an extension direction of the second folding line FOL2 are not limited to a second direction (Y-axis direction). For example, the first folding line FOL1 and the second folding line FOL2 may extend in the X-axis direction, and the display device 10 may be folded in the Y-axis direction. In this case, a length of the display device 10 in the Y-axis direction may be reduced by approximately half. Alternatively, the first folding line FOL1 and the second folding line FOL2 may extend in a diagonal direction of the display device 10 corresponding to a direction between the X-axis direction and the Y-axis direction. In this case, the display device 10 may be folded in a triangular shape.

When the first folding line FOL1 and the second folding line FOL2 extend in the Y-axis direction, a length of the folding area FDA in the X-axis direction may be smaller than a length of the folding area FDA in the Y-axis direction. In addition, a length of the first non-folding area NFA1 in the X-axis direction may be greater than the length of the folding area FDA in the X-axis direction. A length of the second non-folding area NFA2 in the X-axis direction may be greater than the length of the folding area FDA in the X-axis direction.

A first display area DA1 may be located on a front surface of the display device 10. The first display area DA1 may overlap the folding area FDA, the first non-folding area NFA1, and the second non-folding area NFA2. Therefore, when the display device 10 is unfolded, images may be displayed in a front surface direction in the folding area FDA, the first non-folding area NFA1, and the second non-folding area NFA2 of the display device 10.

A second display area DA2 may be located on a rear surface of the display device 10. The second display area DA2 may overlap the second non-folding area NFA2. Therefore, when the display device 10 is folded, an image may be displayed in a front surface direction in the second non-folding area NFA2 of the display device 10.

It has been illustrated in FIG. 13 that a through hole TH in which a camera SDA or the like is formed is located in the first non-folding area NFA1, but embodiments according to the present disclosure are not limited thereto. The through hole TH or the camera SDA may be located in the second non-folding area NFA2 or the folding area FDA.

In concluding the detailed description, those skilled in the art will appreciate that many variations and modifications can be made to the disclosed embodiments without substantially departing from the spirit and scope of embodiments according to the present disclosure, as defined in the appended claims, and their equivalents. Therefore, the disclosed embodiments of the disclosure are used in a generic and descriptive sense only and not for purposes of limitation.

What is claimed is:

1. A display device comprising:

a display panel configured to display an image by including a plurality of pixels arranged in a display area thereof;

a scan driver configured to supply compensation gate scan signals to the plurality of pixels in units of horizontal lines through compensation gate lines of the display area;

a data driver configured to detect pixel driving current values output from the plurality of pixels by the compensation gate scan signals, to generate data voltages according to compensation image data, and to supply the data voltage to data lines of the display area; and a display driver configured to divide the display area into block areas, to set gain values for each of the block areas using the pixel driving current values, to correct image data with the gain values for each of the block areas, and to supply the corrected image data to the data driver, wherein the display driver is configured to generate the compensation image data by compensating for a grayscale value or a luminance value of image data for each of the block areas using the gain values for each of the block areas.

2. The display device of claim 1, wherein the data driver is further configured to:

sense pixel driving voltages and currents for the pixels through voltage detection lines of the display area; and generate current sensing data corresponding to amounts of the sensed pixel driving currents of the pixels and transmit the current sensing data to the display driver.

3. The display device of claim 2, wherein the display driver is further configured to:

divide the display area into preset N×M block areas, where N and M are positive integers, and divide the current sensing data in units of at least one frame for each of the N×M block areas so as to correspond to the N×M block areas; and calculate maximum and average temperature data for each of the N×M block areas so as to correspond to maximum current sensing data and average current sensing data for each of the N×M block areas.

4. The display device of claim 3, wherein the display driver is further configured to:

compare average temperature data of each of the N×M block areas with average temperature data of other block areas adjacent to each other;

compare maximum temperature data of a block area of which maximum average temperature data is calculated to be greatest among the block areas adjacent to each other according to a comparison result with maximum temperature data of other block areas adjacent to each other; and calculate and set a compensation gain value corresponding to each average temperature data for adjacent block areas of which the maximum average temperature data are not calculated.

5. The display device of claim 4, wherein the display driver is further configured to:

calculate and set a compensation gain value corresponding to the average temperature data of each block area based on the maximum temperature data not being calculated to be greatest or highest among the block areas adjacent to each other according to a comparison result between the maximum temperature data; and calculate upper average temperature data for temperature data higher than average temperature data of a corresponding block area based on the maximum temperature data being calculated to be greatest or highest among the block areas adjacent to each other according to the comparison result between the maximum temperature data, modulate or replace the average temperature data of the corresponding block area with the upper average temperature data, and calculate a compensation gain value corresponding to the upper average temperature data.

6. The display device of claim 5, wherein the display driver is further configured to:

divide the image data input from an external source so as to correspond to the N×M block areas, where N and M are positive integers;

compensate for and convert the respective image data corresponding to the N×M block areas using gain values for each of the N×M block areas; and sequentially supply the converted image data to the data driver by an amount corresponding to at least one horizontal line.

7. The display device of claim 2, wherein the display driver includes:

a data dividing and sorting unit configured to divide the display area into preset N×M block areas, where N and M are positive integers, and divide the current sensing data in units of at least one frame for each of the N×M block areas so as to correspond to the N×M block areas; and a temperature data configured to generate unit comparing current values of the current sensing data for each of the N×M block areas with each other and to perform an average operation to calculate maximum current sensing data and average current sensing data for each of the N×M block areas, and to calculate maximum and average temperature values respectively corresponding to maximum and average current values included in the maximum current sensing data and the average current sensing data and maximum and average temperature data for each of the N×M block areas respectively including the maximum and average temperature values.

8. The display device of claim 7, wherein the display driver further includes a temperature data correction processing unit configured to:

compare average temperature data of each of the N×M block areas with average temperature data of other block areas adjacent to each other;

compare maximum temperature data of a block area of which maximum average temperature data is calculated to be greatest among the block areas adjacent to each other according to a comparison result with maximum temperature data of other block areas adjacent to each other; and calculate upper average temperature data for temperature data higher than average temperature data of a corresponding block area based on the maximum temperature data being calculated to be greatest or highest among the block areas adjacent to each other according to a comparison result between the maximum temperature data and modulate or replace the average temperature data of the corresponding block area with the upper average temperature data.

9. The display device of claim 8, wherein the display driver further includes a gain value generating unit configured to:

calculate a gain value corresponding to each average temperature data for block areas of which the maximum average temperature data are not calculated to be greatest among the block areas arranged adjacent to each other;

calculate the gain value corresponding to each average temperature data for adjacent block areas of which the maximum temperature data are not calculated to be greatest or highest among the block areas arranged adjacent to each other; and calculate a gain value corresponding to the upper average temperature data for a block area of which the average temperature data is modulated with the upper average temperature data.

10. A display device comprising:

a display panel configured to display an image by including a plurality of pixels arranged in a display area thereof;

a scan driver configured to supply compensation gate scan signals to the plurality of pixels in units of horizontal lines through compensation gate lines of the display area;

a data driver configured to detect pixel driving current values output from the plurality of pixels by the compensation gate scan signals, to generate data voltages according to compensation image data, and to supply the data voltage to data lines of the display area; and a display driver configured to divide the display area into block areas, to set gain values for each of the block areas using the pixel driving current values, to correct image data with the gain values for each of the block areas, and to supply the corrected image data to the data driver, wherein the display driver is configured to divide the display area into preset N×M block areas, where N and M are positive integers, and to generate the compensation image data by compensating for and modulating image data for each of the N×M block areas with the gain values for each of the N×M block areas.

11. The display device of claim 10, wherein the data driver is further configured to:

sense pixel driving voltages and currents for the pixels through voltage detection lines of the display area; and generate current sensing data corresponding to amounts of the sensed pixel driving currents of the pixels and transmit the current sensing data to the display driver.

12. The display device of claim 11, wherein the display driver is further configured to:

divide the current sensing data in units of at least one frame for each of the N×M block areas so as to correspond to the N×M block areas; and calculate maximum and average temperature data for each of the N×M block areas so as to correspond to maximum current sensing data and average current sensing data for each of the N×M block areas.

13. The display device of claim 12, wherein the display driver is further configured to:

compare average temperature data of each of the N×M block areas with average temperature data of other block areas adjacent to each other;

compare maximum temperature data of a block area of which maximum average temperature data is calculated to be greatest among the block areas adjacent to each other according to a comparison result with maximum temperature data of other block areas adjacent to each other; and calculate and set a gain value corresponding to each average temperature data for adjacent block areas of which the maximum average temperature data are not calculated.

14. The display device of claim 13, wherein the display driver is further configured to:

calculate and set a gain value corresponding to the average temperature data of each block area based on the maximum temperature data not being calculated to be greatest or highest among the block areas adjacent to each other according to a comparison result between the maximum temperature data; and calculate upper average temperature data for temperature data higher than average temperature data of a corresponding block area based on the maximum temperature data being calculated to be greatest or highest among the block areas adjacent to each other according to the comparison result between the maximum temperature data, modulate or replace the average temperature data of the corresponding block area with the upper average temperature data, and calculate a gain value corresponding to the upper average temperature data.

15. The display device of claim 11, wherein the display driver is further configured to include:

a data dividing and sorting unit configured to divide the current sensing data in units of at least one frame for each of the N×M block areas so as to correspond to the N×M block areas; and a temperature data generating unit configured to compare current values of the current sensing data for each of the N×M block areas with each other and to perform an average operation to calculate maximum current sensing data and average current sensing data for each of the N×M block areas, and to calculate maximum and average temperature values respectively corresponding to maximum and average current values included in the maximum current sensing data and the average current sensing data and maximum and average temperature data for each of the N×M block areas respectively including the maximum and average temperature values.

16. The display device of claim 15, wherein the display driver further includes a temperature data correction processing unit configured to:

compare average temperature data of each of the N×M block areas with average temperature data of other block areas adjacent to each other;

compare maximum temperature data of a block area of which maximum average temperature data is calculated to be greatest among the block areas adjacent to each other according to a comparison result with maximum temperature data of other block areas adjacent to each other; and calculate upper average temperature data for temperature data higher than average temperature data of a corresponding block area based on the maximum temperature data being calculated to be greatest or highest among the block areas adjacent to each other according to a comparison result between the maximum temperature data and modulate or replace the average temperature data of the corresponding block area with the upper average temperature data.

17. The display device of claim 16, wherein the display driver further includes a gain value generating unit configured to:

calculate a gain value corresponding to each average temperature data for adjacent block areas of which the maximum average temperature data are not calculated to be greatest among the adjacent block areas;

calculate the gain value corresponding to each average temperature data for adjacent block areas of which the maximum temperature data are not calculated to be greatest or highest among the adjacent block areas; and calculate a gain value corresponding to the upper average temperature data for a block area of which the average temperature data is modulated with the upper average temperature data.

18. An electronic device including a display device, wherein the display device comprising:

a display panel configured to display an image by including a plurality of pixels arranged in a display area thereof;

a scan driver configured to supply compensation gate scan signals to the plurality of pixels in units of horizontal lines through compensation gate lines of the display area;

a data driver configured to detect pixel driving current values output from the plurality of pixels by the compensation gate scan signals, to generate data voltages according to compensation image data, and to supply the data voltage to data lines of the display area; and a display driver configured to divide the display area into block areas, to set gain values for each of the block areas using the pixel driving current values, to correct image data with the gain values for each of the block areas, and to supply the corrected image data to the data driver, wherein the display driver is configured to generate the compensation image data by compensating for a grayscale value or a luminance value of image data for each of the block areas using the gain values for each of the block areas.

* * * * *